United States Patent [19]

Owada et al.

[11] 4,329,122
[45] May 11, 1982

[54] SUBMERSIBLE MOTOR APPARATUS

[75] Inventors: Takeyoshi Owada, Funabashi; Yasuro Suzuki, Narashino, both of Japan

[73] Assignee: Hitachi, Ltd., Tokyo, Japan

[21] Appl. No.: 35,238

[22] Filed: May 2, 1979

[30] Foreign Application Priority Data

May 8, 1978 [JP] Japan .................................. 53/53759

[51] Int. Cl.³ ............................................ F04D 13/08
[52] U.S. Cl. ..................................... 417/365; 310/87;
310/90; 310/112; 308/135
[58] Field of Search .................. 417/365, 424; 310/87,
310/90, 114, 112, 157; 308/135; 175/104, 105

[56] References Cited

U.S. PATENT DOCUMENTS

| | | | |
|---|---|---|---|
| 1,960,484 | 5/1934 | Ekstromer | 310/112 |
| 1,966,795 | 7/1934 | Garrison | 308/135 |
| 2,098,958 | 11/1937 | Ekstromer | 310/112 |
| 2,612,843 | 10/1952 | Gruetjon | 417/424 |
| 3,384,769 | 5/1968 | Schaefer et al. | 310/90 |
| 3,494,291 | 2/1970 | Carter | 417/424 |
| 3,617,156 | 11/1971 | Schiele et al. | 417/365 |
| 4,084,924 | 4/1978 | Ivanoff et al. | 417/424 |

*Primary Examiner*—Richard E. Gluck
*Attorney, Agent, or Firm*—Craig & Antonelli

[57] ABSTRACT

A submersible motor apparatus having a plurality of unit motors connected in series through their shafts in the direction of application of gravity. The shaft of an uppermost unit motor constituting an output shaft of the motor apparatus to which a pump is to be connected. The submersible motor apparatus has an upper thrust bearing disposed above the level of the stator core of the uppermost unit motor and adapted to bear the axial load applied to the shaft of the uppermost unit motor, and a lower thrust bearing disposed below the level of the stator core of a lowermost unit motor and adapted to bear the axial load exerted to the shaft of the lowermost unit motor. The shafts of the unit motors are connected in series by splined couplings.

6 Claims, 8 Drawing Figures

FIG. 1
FIG. 2
FIG. 3
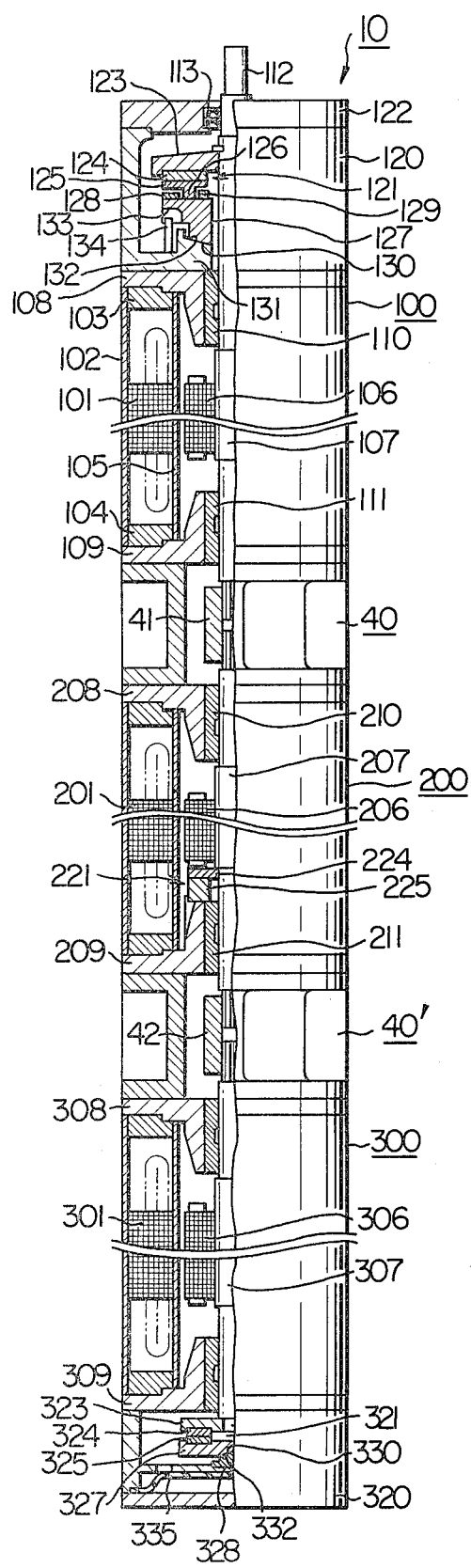
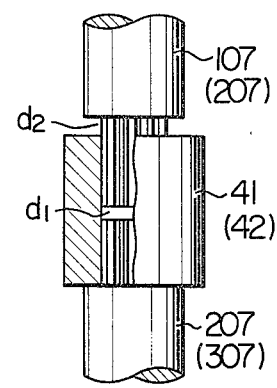
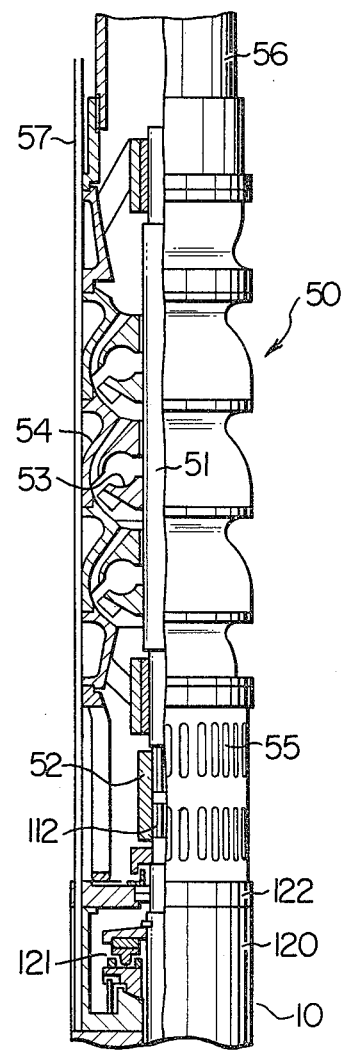

SUBMERSIBLE MOTOR APPARATUS

BACKGROUND OF THE INVENTION

1. Field of the Invention

The present invention relates to a motor apparatus comprising a plurality of axially connected unit motors and thus having a large axial length as compared with the diameter. More particularly, the invention is concerned with a submersible motor suitable for use in driving a pump which is submersible into a deep well.

2. Description of the Prior Art

In order to diminish a pump system on the ground, it is conventional to pump up underground water in a well by means of a submersible pump installed at the bottom of the well and coupled to a submersible motor. In this type of pumping system, however, the pump must work to provide a considerably high delivery pressure when the depth of the well is large and, thus, requires submersible motor apparatus of a large output. A large-sized high output motor apparatus needs a well of a large diameter. It requires not only a high degree of technology but also a huge cost to enlarge the diameter of an already constructed well or to sink a new well of a large diameter. This is particularly true with a deep well. Therefore, in the case where the well has a limited diameter, the motor which can be used with the well and provide a required output must be of a large axial size as compared with the diameter of the well. Such a type of submersible motor, however, has stator and rotor cores of increased thicknesses which extremely lowers the working property of the stator and rotor, particularly, the coil winding operation of the stator and die-casting of the rotor. Additionally, the increased thickness of the rotor core tends to cause deflection and oscillation of the rotatable part of the motor thereby resulting in a motor which is extremely unstable from a mechanical point of view.

In order to facilitate the production of a submersible motor, it has been proposed and practised to axially divide the stator and the rotor of the motor into a plurality of sections, i.e. into a plurality of unit motors which are connected in series to constitute a submersible motor apparatus. In many cases, the upper shaft end of the uppermost unit motor is used as the output shaft of the motor apparatus, to which the shaft of the submersible pump is connected. The lower shaft end of the lowermost unit motor is associated with a thrust bearing for the axial thrust applied by the submersible pump and all the unit motors.

The submersible motor having the described construction and arrangement naturally produces a considerable amount of heat during its operation to cause a much greater temperature differential between the inner and outer walls of the motor than encountered by ordinary motors used in the air, because the casing of the submerged motor is cooled by the ambient water and maintained at a temperature substantially equal to 20° C. The temperature differential between the inner and outer portions of the motor results in a thermal expansion of the rotor shaft of the motor. Assuming that a submersible motor has an overall length of 2 m, the temperature differential between the inner and outer portions of the motor is 50° C., and the coefficient of thermal expansion of the rotor shaft is $1.6 \times 10^{-5}$ mm/°C., the thermal expansion d of the shaft in the axial direction is calculated as follows:

$$d = 2,000 \times 1.6 \times 10^{-5} \times 50 = 1.6 \text{ (mm)}$$

Thus, the rotor shaft exhibits an axial thermal expansion of 1.6 mm when the motor is operated continuously. Since the lower end of the motor shaft is born by a thrust bearing, the axial thermal expansion of the shaft is transmitted to the shaft of the submersible pump to lift the pump runner to thereby vary the gap between the pump runner and the pump casing, resulting in various inconveniences such as decrease in the performance of the pump and overload on the motor due to a change in the characteristic of the pump. It is conceivable that the pump runner could directly contact the pump casing due to the lifting of the pump runner. In such a case, not only is the submersible pump seriously damaged but also an extraordinarily heavy load is dangerously applied to the thrust bearing.

It is also to be pointed out that the axial thermal expansions of the unit motors are accumulated to cause an axial offset of the magnetic center of the rotor from the magnetic center of the stator in each unit motor, with the axial offset being larger in the superposed unit motor than in the underlying unit motor. This axial offset of the magnetic center of the rotor from the magnetic center of the stator produces an axial component of the magnetic attractive force between the rotor and the stator. This axial force component is effective to increase the load applied onto the thrust bearing to thereby shorten the operative life thereof.

In contrast to the above-stated submersible motor having a thrust bearing disposed at the lower end of the rotor shaft, there has been proposed another type of motor apparatus in which a thrust bearing for receiving the axial load on the submersible pump and all unit motors is provided at the upper shaft end of the uppermost unit motor. While this type of motor can prevent the axial thermal expansion of the rotor shaft from being transmitted to the shaft of the submersible pump, the motor needs a thrust bearing of an increased diameter because the thrust bearing must be provided therein with a bore through which the motor shaft extends. The increase in the thrust bearing diameter results in the increase in the diameter of the submersible motor apparatus. In addition, the thermal expansion of the rotor shafts of series-connected unit motors are accumulated in downward direction, so that the underlying unit motor exhibits a larger axial offset of the magnetic center of the rotor from the magnetic center of the stator than in the superposed unit motor, with a result that the output power of the submersible motor apparatus is decreased, which, in turn, tends to cause the motor apparatus to be overloaded.

SUMMARY OF THE INVENTION

It is therefore an object of the present invention to provide submersible motor apparatus in which the thermal expansion of the rotor shaft is not transmitted to a superposed load machine (such as a submersible pump) and in which the axial thermal expansion is not undesirably accumulated.

According to the invention, there is provided a submersible motor apparatus having the following features. Namely, the submersible motor apparatus of the invention has an upper thrust bearing which is provided at the upper end of the uppermost unit motor and adapted for bearing the axial load imparted to the rotor shaft by the weight of the driven machine and also by the weight of the rotary parts of the uppermost unit motor itself. The motor apparatus is further provided with a lower thrust bearing disposed at the lower end of the lowermost unit motor and adapted to receive the weights of the rotary parts of unit motor or motors other than the uppermost one. In addition, in order to take up the axial thermal expansion of the rotor shafts of the unit motors, the rotor shafts of adjacent unit motors are drivingly connected by means of couplings designed to allow a slight axial movement relatively to each other.

In the submersible motor apparatus of the invention having the described construction, the axial thermal expansions of the rotor shafts of all unit motors are conveniently absorbed or taken up by the couplings even if the submersible motor apparatus is operated under such a condition as to cause a large temperature differential between the inner and outer portions of the motor. It is therefore possible to continue the operation of the load machine connected to the submersible motor apparatus for a long time in such a manner that the load machine is free from any bad influence of the thermal expansion. In addition, since the axial load of the submersible motor apparatus is shared by the upper and the lower thrust bearings, the level of the load carried by each thrust bearing is sufficiently small to allow a reduction of the thrust bearing diameter to such an extent as to permit the installation of the submersible motor apparatus in a well having a limited diameter.

The submersible motor apparatus of the invention having the described structural feature also offers an advantage that it is possible to optionally produce a submersible motor apparatus having a desired capacity, simply by connecting the required number of unit motors.

Another object of the invention is to provide a submersible motor apparatus which comprises a plurality of unit motors connected in series and in which each unit motor can be operated independently of another or other unit motors so that tests can be conducted on respective parts of the motor apparatus.

To this end, each unit motor is provided with radial bearings for preventing lateral oscillation and also with an upper or a lower thrust bearing for receiving an axial load applied to the rotor shaft of each unit motor, so that each unit motor may be operated even solely.

This arrangement permits independent fabrication of each unit motor and allows each unit motor to be tested independently. This makes it possible to produce a submersible motor apparatus having a predetermined operation characteristic because the motor apparatus can be composed of unit motors each of which has been fully tested in respect of its operation characteristic before the assembly of the unit motors. This is quite advantageous in that if the prior art submersible motor apparatus was tested after the assembly of unit motors, if any defect was found, the motor apparatus had to be disassembled for readjustment or correction. The submersible motor apparatus according to the invention can be manufactured at a lower cost and, in addition, permits an easy change of capacity after the assembly of unit motors.

BRIEF DESCRIPTION OF THE DRAWINGS

FIG. 1 is a partly sectioned illustration of a submersible motor apparatus in accordance with a first embodiment of the invention comprising three unit motors superposed and connected in series;

FIG. 2 is an enlarged partial sectional view of a part of the submersible motor apparatus shown in FIG. 1, showing particularly a coupling member by which the rotor shafts of adjacent unit motors are connected to each other;

FIG. 3 shows partly in section the submersible motor apparatus as shown in FIG. 1 associated with a load machine which is in the form of a submersible pump connected to and driven by the submersible motor apparatus;

DESCRIPTION OF THE PREFERRED EMBODIMENTS

Figure 4:
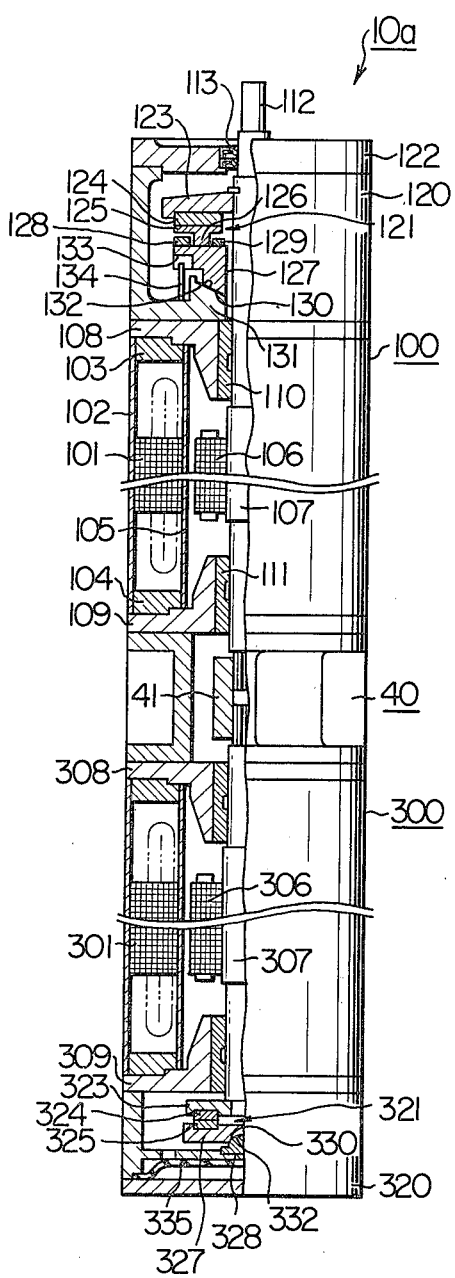
FIG. 4 is a partly sectioned illustration of a second embodiment of the invention comprising two unit motors superposed and connected to each other.

Referring first to FIG. 1 showing a first embodiment of the invention, a submersible motor apparatus generally designated by reference numeral 10 has three unit motors 100, 200 and 300 which are superposed one on another and connected in series by means of coupling sections 40 and 40'. The uppermost unit motor 100 has an outer frame which is constituted by a housing 102 accomodating a stator 101, an upper end cover 120 accomodating an upper thrust bearing 121 and an upper end bracket 122 closing the upper end of the upper end cover 120 and providing a surface through which the submersible motor apparatus is connected to a load machine.

Figure 6:
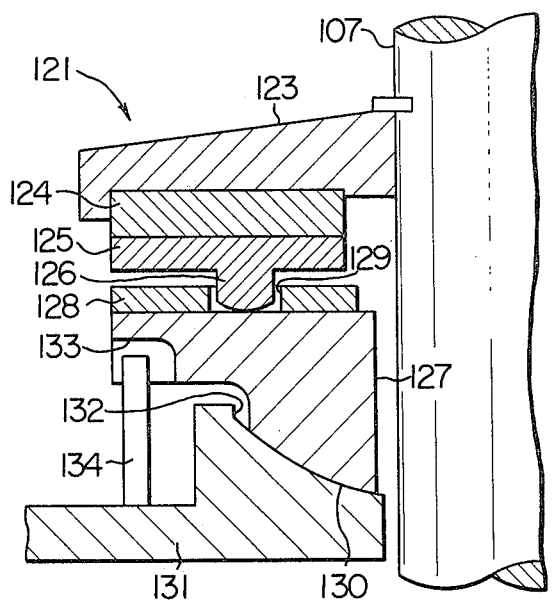
FIG. 6 is a partly sectioned enlarged view showing the construction of an upper thrust bearing incorporated in each of the three embodiments of the invention.

The construction of the unit motor 100 will be described in detail with reference also to FIG. 6. The stator 101 has a stator core with a stator coil wound thereon and is fixed to the inside of the cylindrical housing 102. Annular end plates 103, 104 are fitted and fixed to both open ends of the housing 102. Reference numeral 105 denotes a can made of a nonmagnetizable material such as a sheet of stainless steel and disposed inside the stator 101. This can 105 is welded at its ends to the inner peripheral edges of the annular end plates 103, 104 to thereby seal and protect the stator 101 by cooperation with the housing 102.

Reference numeral 106 denotes a rotor which has a rotor core provided with a secondary conductor of a die-cast aluminum body. The rotor 106 is disposed inside the can 105 in radially aligned relationship to the stator 101 disposed radially outward of the can 105. The rotor 106 is carried by a shaft 107. Fixed to the outer sides of the annular end plates 103, 104 are disc-shaped upper and lower brackets 108, 109, respectively, which are provided with central openings through which the shaft 107 extends rotatably. These upper and lower brackets 108, 109 constitute radial bearings for preventing lateral oscillation of the shaft 107. Namely, cylindrical metal sleeves 110, 111 are received by and fixed to the central openings of the upper and lower brackets 108, 109 for rotatably supporting the shaft 107. The upper end of the shaft 107 projects in the axial direction from the unit motor 100 and extends through the upper end cover 120 and the upper bracket 122 to constitute an output shaft 112. Reference numeral 113 denotes a seal disposed between the upper end bracket 122 and the shaft 107 to seal the upper end cover 120 against the surrounding water. A disc-shaped bearing frame 123 is fixed to the portion of the shaft 107 inside the upper end bracket 122 and is provided on its under surface with a thrust disc 124 which is in slidable engagement with a second metal thrust member 125 which is divided in the circumferential direction into three segments. Each segment has a pin 126 extending from the side thereof opposite to the sliding surface. The pin 126 is loosely received by a guide hole 129 formed in an annular metal support 128 attached to the upper surface of a metal frame 127. The loose engagement of the pin 126 with the guide hole 129 permits a small tilting or pivotal movement of each segment of the thrust member 125. The under surface of the metal frame 127 includes a hemispherical convex surface 130 which is in slidable engagement with a substantially frustoconical hemispherical concave surface 132 of a bearing support frame 131. The slidable engagement between the convex and concave surfaces 130 and 132 permits a free tilting movement of the metal frame 127 within a certain range. This tilting movement of the metal frame 127 in combination with the aforementioned pivotal movements of the respective segments of the thrust member 125 provides the bearing with a self-aligning performance which ensures an even distribution of the load to all segments of the thrust metal 125. The metal frame 127 is prevented from rotating together with the thrust disc 124, by means of pins 134 provided on the inner surface of the thrust support frame 131 and engaged with holes 133 formed in the under side of the metal frame 127.

Figure 7:
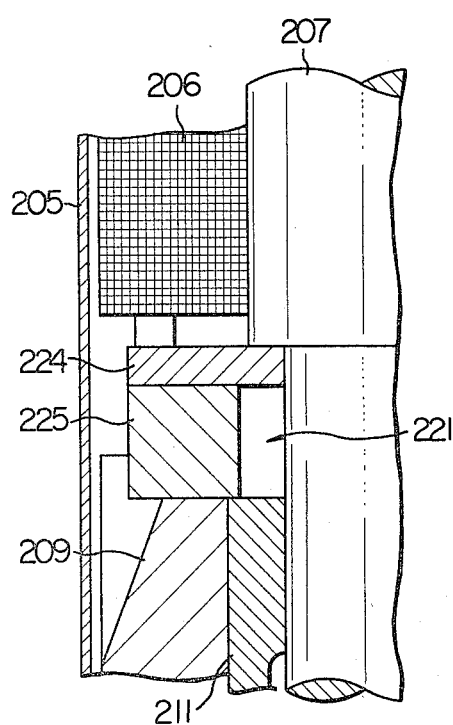
FIG. 7 is a partly sectioned enlarged view showing the construction of a lower thrust bearing of an intermediate unit motor of the first embodiment of the invention.

Referring also to FIG. 7 showing the structural details of the intermediate unit motor 200, this unit motor 200 has a lower thrust bearing generally designated by the reference numeral 221 adapted to receive the axial load on a shaft 207. The lower thrust bearing 221 includes an annular thrust disc 224 which is attached to the portion of the shaft 207 extending downward from the rotor 206 and is rotatable together with the shaft 207, and a ring-shaped metal thrust member 225 attached to the upper end of a lower bracket 209 for supporting the thrust disc 224. Other portions of the intermediate unit motor 200 are not described because they are materially identical to those of the uppermost unit motor 100. These other portions of the motor 200 are designated by reference numerals which are obtained by adding 100 (one hundred) to the reference numerals for corresponding portions of the uppermost unit motor 100.

Figure 8:
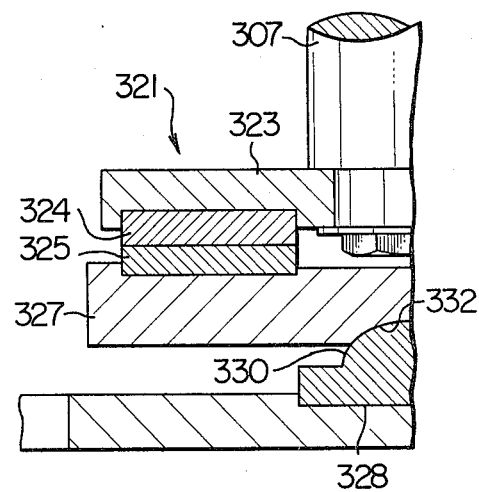
FIG. 8 is a partly sectioned enlarged view showing the construction of a lower thrust bearing incorporated in each of the three embodiments of the invention.

The construction of the lowermost unit motor 300 will be described with reference also to FIG. 8. An end cover 320 is attached to the lower end of the unit motor 300 and accomodates a lower thrust bearing 321 adapted for bearing an axial load on a shaft 307. A disc-shaped bearing frame 323 is fixed to the lower end of the shaft 307. An annular thrust disc 324 is attached to the under surface of the bearing frame 323. This thrust disc 324 is in slidable engagement with a metal thrust member 325 fixed to the upper surface of a metal frame 327.

A recess having a hemispherical concave surface is formed in the undersurface of the metal frame 327 in the central area thereof and is in slidable engagement with a hemispherical convex surface 330 formed on the upper surface of a thrust plate 328. The lower thrust bearing 321 having the described construction is given a self-aligning performance similar to that of the upper thrust bearing 121 previously described. A bellows or a diaphragm 335 is attached to the lowermost end portion of the submersible motor apparatus, i.e., axially outwardly of the thrust plate 328 so that the pressures inside and outside the motor apparatus are balanced across the diaphragm. The rest of the lowermost unit motor 300 are substantially similar to those of the unit motor 100 and thus will not be described herein. It will be sufficient to make a reference that the parts of the unit motor 300 other than those described above are designated by reference numerals obtained by adding 200 to the reference numerals for the corresponding parts of the uppermost unit motor 100.

A cylindrical coupling section 40 having ends formed of annular flanges is disposed between the uppermost unit motor 100 and the intermediate unit motor 200 to connect them together. Also, the intermediate unit motor 200 and the lowermost unit motor 300 are connected together by means of a similar coupling section 40'. These coupling sections 40, 40' include coupling members 41 and 42 which connect the shaft 207 to the shaft 107 and to the shaft 307, respectively. The coupling members 41, 42 are provided with splines formed on their inner peripheral surfaces, while the shafts 107, 207 and 307 are provided with splines on their outer peripheral surfaces. The shafts 107, 207, 307 are coupled by the coupling members 41 and 42 so that the thermal expansions of the shafts 107, 207, 307 are taken up while a torque transmission is achieved between adjacent shafts. More specifically, as shown in FIG. 2, a small gap $d_1$ is left between the opposing ends of adjacent shafts 107, 207, 307 and a play $d_2$ is preserved between the end surface of the coupling member 41 (42) and a shoulder on an associated shaft 107 (207) to allow a slight axial displacement of the coupling member itself relative to the pair of shafts coupled.

FIG. 3 shows the submersible motor apparatus 10 of the described embodiment coupled with a submersible pump 50. The submersible pump 50 has a shaft 51 which is connected to the output shaft 112 of the submersible motor 10 by means of a coupling 52 and carries a series of pump runners 53. The pump runners 53 are covered with a pump casing 54. Reference numerals 55, 56 and 57 denote, respectively, inlet ports of the pump, a discharge pipe connected to a discharge port of the pump and a lead wire conductor through which the electric power is supplied to the submersible motor apparatus 10.

In operation, the submersible motor apparatus 10 is charged with water for the lubrication of the respective bearings. The submersible motor apparatus is then coupled to the submersible pump 50 to form a motor and pump assembly which is then placed into a well. When the submersible motor apparatus is energized, the submersible pump 50 is driven by the motor apparatus to suck the water through the inlet ports 55 and deliver the sucked water through the discharge pipe 56. During operation, the upper thrust bearing 121 of the uppermost unit motor 100 is subjected to the weights of the rotary parts of the submersible pump 50 and the uppermost unit motor 100 and, in addition, to an axial load produced by the reactionary force produced by the pumping action of the pump 50. The lower thrust bearing 221, provided for the intermediate unit motor 200, receives the weight of the rotary parts of the unit motor 200 itself. Similarly, the lower thrust bearing 321 provided for the lowermost unit motor 300 receives the weight of the rotary parts of this motor.

The temperature in the submersible motor apparatus 10 is gradually raised as the submersible motor apparatus 10 operates continuously, while the outer portion of the motor apparatus 10 is constantly cooled by the underground water in the well, so that the temperature differential between the outer and inner portions of the submersible motor apparatus 10 is gradually increases to cause a thermal expansion of the inner portion and, particularly, the shafts 107, 207 and 307. The thermal expansion of the shaft 107 causes a downward expansion of the same because the upper end of this shaft is supported by the upper thrust bearing 121, whereas the shafts 207 and 307 are made to expand axially upwardly because they are supported at their lower ends by respective lower thrust bearings 221 and 321. These axial expansions of the shafts, however, are conveniently taken up by the reduction in the dimensions of the of gaps $d_1$ and $d_2$ preserved in respective coupling sections 40 and 40'.

In the described embodiment of the invention, the submersible pump 50 can operate at its optimum operating condition because the thermal expansions of the shafts 107, 207 and 307 are taken up by the coupling sections 40 and 40' and thus are not transmitted to the pump 50.

It is possible to design each unit motor such that, at the beginning of operation of the motor, the rotor 106 (206, 306) is axially displaced from the associated stator a distance in the direction opposite to the direction of thermal expansion of the shaft 107 (207, 307) so that, when the temperature in the motor is raised during operation to thermally expand the shaft, the rotor 107 may be displaced back into alignment with the stator.

The unit motors 100, 200 and 300 are provided with radial bearings 108, 109; 208, 209 and 308, 309 for radially supporting the opposite ends of respective shafts 107, 207 and 307 and with thrust bearings 121, 221 and 321 for bearing the weights of the rotary parts of these unit motors themselves. This arrangement allows each of the unit motors to be prepared and operated independently of one another. It is therefore possible to test a plurality of unit motors individually before these unit motors are assembled into a final submersible motor apparatus. Accordingly, the manufacturer can conveniently be given a chance to check, prior to assembly of a set of unit motors, as to if the set of unit motors includes any defective or faulty one. As such, it can be assured that a finished submersible motor 10 is free from any faulty unit motor.

It is also to be noted that the capacity of a submersible motor apparatus 10 can be varied as desired without changing the diameter of the motor apparatus, by simply placing a desired number of unit motors between the uppermost unit motor 100 having the upper thrust bearing 121 and the lowermost unit motor 300 having the lower thrust bearing 321. For a similar reason, the capacity of a submersible motor apparatus which has already been put in operation can be varied by changing the number of the intermediate unit motors 200.

An example of the variation in the motor capacity is represented by a second embodiment of a submersible motor apparatus generally designated by the reference numeral 10a of the invention shown in FIG. 4. This embodiment comprises two unit motors 100 and 300 connected together in the direction of gravity. The shafts 107 and 307 of these unit motors 100 and 300 are drivingly connected by a splined coupling member 41 so that the thermal expansions of these shafts 107 and 307 can be taken up by the coupling.

Figure 5:
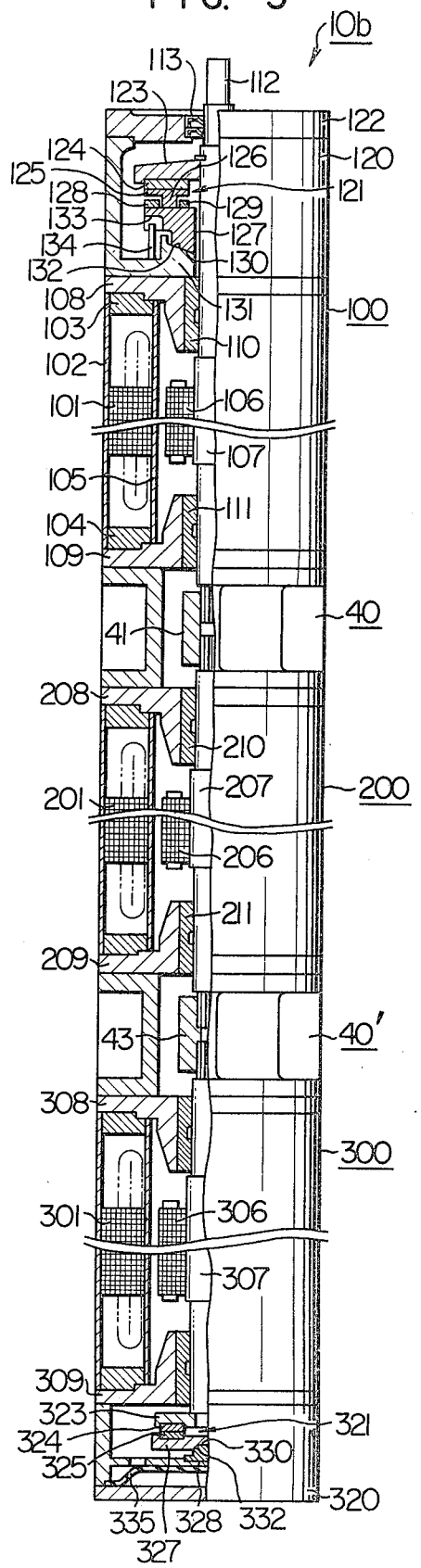
FIG. 5 is a partly sectioned illustration of a third embodiment of the invention comprising three unit motors superposed and connected in series and provided with thrust bearings only at the uppermost and lowermost ends of the submersible motor apparatus.

In the embodiments of the invention described above, each unit motor is provided with its own thrust bearing. This arrangement, however, is not essential for the invention. In the case where the rotary part of each unit motor is of a relatively light weight, a more simplified design can be employed in which the intermediate unit motor 200 is not provided with its own lower thrust bearing and the weight of the rotary part of this unit motor is born by the lower thrust bearing of the lowermost unit motor 300. An example of such a simplified motor design is employed by a further embodiment of a submersible motor apparatus generally designated by the reference numeral 10b shown in FIG. 5.

The further embodiment of the submersible motor apparatus 10b according to the present invention comprises three unit motors 100, 200 and 300 connected in series in the direction of the gravity. The load applied in the direction of the gravity to the rotary part of the uppermost unit motor 100 is borne by the upper thrust bearing 121 disposed at the upper end of the unit motor 100, while the weights of the rotary parts of the unit motors 200 and 300 are borne by the lower thrust bearing 321 disposed at the lower end of the unit motor 300. The shaft 107 of the uppermost unit motor 100 and the shaft 207 of the adjacent intermediate unit motor 200 are connected to each other by splined coupling member 41 which is so designed as to take up the thermal expansions of these shafts. However, a coupling member 43 disposed between the shafts 207 and 307 of the intermediate and lowermost unit motors 200 and 300 is not designed to take up the thermal expansions of these shafts but constructed to transmit the weight of the rotary part of the intermediate unit motor 200 to the shaft 307 of the lowermost unit motor 300.

Although embodiments of the present invention have been described in connection with a submersible pump 50 as a load machine to be driven by the motor apparatus of the invention, the application of the motor apparatus according to the present invention is not limited to a submersible pump. The motor apparatus can also be used to drive other load machines which either impart an axial load to the output shaft of the motor apparatus or encounter a serious reduction in the performance when oscillated in the axial direction.

What is claimed is:

1. A submersible motor apparatus in combination with a submersible pump connected to an output shaft of said motor apparatus, said motor apparatus comprising at least two unit motors having shafts connected in series in the direction of gravity, each unit motor including a stator core and a rotor core, the shaft of the uppermost unit motor constituting the output shaft of said motor apparatus, said pump being connected to said motor apparatus such that a suction side of said pump is disposed adjacent to said motor apparatus, wherein the improvement comprises:
    upper and lower brackets closing the upper and lower ends of each unit motor;

upper and lower radial bearings in the form of cylindrical sleeves mounted on and disposed centrally of said upper and lower brackets of each unit motor;

the shaft of each unit motor extending through said sleeves for axial movement relative to said sleeves;

an upper thrust bearing disposed above the upper sleeve of said uppermost unit motor and being adapted to bear the weight of the stator and shaft of said uppermost unit motor and a thrust produced in said pump during pumping operation and exerted to said motor output shaft in the direction of gravity;

a lower thrust bearing disposed below the lower sleeve of the lowermost unit motor and being adapted to bear an axial load applied to the shaft of said lowermost unit motor; and a coupling means disposed between said uppermost unit motor and the unit motor immediately following said uppermost unit motor to connect the lower and upper ends of the shaft of said uppermost and following unit motors relative axial movement with respect to each other.

2. A submersible motor apparatus comprising two unit motors disposed in alignment with each other in the direction of gravity and connected in end-to-end relationship with each other, each unit motor including a shaft, a stator core, and a rotor core, the shaft of an upper unit motor constituting an output shaft of the motor apparatus to which a load machine is to be coupled, wherein the improvement comprises:

upper and lower brackets closing upper and lower ends of each unit motor;

upper and lower radial bearings in the form of cylindrical sleeves mounted on and disposed centrally of said upper and lower brackets of each unit motor;

the shaft of each unit motor extending through the sleeves for axial movement relative to the sleeves;

an upper thrust bearing disposed above the upper sleeve of said upper unit motors;

a lower thrust bearing disposed below the lower cylindrical sleeve of the lower unit motor and being adapted to bear an axial load imparted to the shaft of said lower unit motor;

a coupling means connecting the lower and upper ends of the shafts of said upper and lower unit motors so that the shaft ends are axially movable toward and away from each other.

3. A submersible motor apparatus as claimed in claim 2, wherein said coupling means comprises a coupling member having a substantially cylindrical splined inner surface, the splines being in engagement with splines formed on the outer peripheral surfaces of the lower and upper end portions of the shafts of said upper and lower unit motors.

4. A submersible motor apparatus as claimed in claim 2, wherein each of said upper and lower thrust bearing includes an annular thrust disc fixed to the shaft of an associated unit motor and a thrust member disposed in face-to-face sliding engagement with said thrust disc.

5. A submersible motor apparatus comprising at least three unit motors disposed in alignment with each other in a direction of gravity and connected in an end-to-end relationship with each other, each unit motor including a shaft, a stator core and a rotor core, the shaft of the uppermost unit motor consituting an output shaft of the motor apparatus to which a load machine is to be coupled, wherein the improvement comprises:

upper and lower brackets closing the upper and lower end of each unit motor;

upper and lower radial bearings in the form of cylindrical sleeves mounted on and disposed centrally of said upper and lower brackets of each unit motor;

the shaft of each unit motor extending through said sleeves for axial movement relative to said sleeves;

an upper thrust bearing disposed above the upper sleeve of the uppermost unit motor and being adapted to bear an axial load applied to the shaft of said upper unit motor;

a lower thrust bearing disposed below the lower sleeve of the lowermost unit motor and being adapted to bear an axial load applied to the shaft of said lowermost unit motor;

a third thrust bearing disposed between the lower sleeve of at least one unit motor other than said uppermost and lowermost unit motors and the rotor core of said other unit motor to bear the axial load imparted to the shaft of said other unit motor; and coupling means disposed between adjacent pairs of the unit motors and connecting the shafts of respective pairs of unit motors in a torque transmitting relationship with each other, each coupling means being arranged to permit relative axial movements of the lower and upper ends of the shafts of an associated pair of unit motors.

6. A submersible motor apparatus comprising at least three unit motors disposed in alignment with each other in a direction of gravity and connected in end-to-end relationship with each other, each unit motor including a shaft, a stator core, and a rotor core, the shaft of the upper most unit motor constituting an output shaft of the motor apparatus to which a load machine is to be coupled, wherein the improvement comprises:

upper and lower brackets closing the upper and lower ends of each unit motor;

upper and lower radial bearings in the form of cylindrical sleeves mounted on and disposed centrally of said upper and lower brackets of each unit motor;

the shaft of each unit motor extending through said cylindrical sleeves for axial movement relative to said cylindrical sleeves;

an upper thrust bearing disposed above the upper cylindrical sleeve of the uppermost unit motor and being adapted to bear an axial load applied to the shaft of said upper unit motor;

a lower thrust bearing disposed below the lower sleeve of the lowermost unit motor and being adapted to bear an axial load applied to the shaft of the lowermost unit motor;

coupling means disposed between each adjacent pair of the unit motors and connecting the shafts of the pair of unit motors in torque transmitting relationship with each other;

the coupling means disposed between the uppermost unit motor and unit motor following the uppermost unit motor being arranged to permit relative axial movements of the lower and upper ends of the shafts of the uppermost unit motor and said following unit motor toward and away from each other; and the coupling means disposed between the lowermost unit motor and the unit motor directly preceeding said lowermost unit motor is arranged to transmit to the shaft of the lowermost unit motor an axial load applied to the shaft of said directly preceeding unit motor.

* * * * *